(12) United States Patent
Liu et al.

(10) Patent No.: US 12,549,489 B2
(45) Date of Patent: Feb. 10, 2026

(54) METHOD FOR EXTRACTING A SERVICE FEATURE, QUALITY OF SERVICE SCHEDULING METHOD, ELECTRONIC DEVICE AND COMPUTER-READABLE STORAGE MEDIUM

(71) Applicant: ZTE CORPORATION, Guangdong (CN)

(72) Inventors: Yang Liu, Guangdong (CN); Fulei Liu, Guangdong (CN); Jie Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/681,560

(22) PCT Filed: Aug. 19, 2022

(86) PCT No.: PCT/CN2022/113546
§ 371 (c)(1),
(2) Date: Feb. 6, 2024

(87) PCT Pub. No.: WO2023/025052
PCT Pub. Date: Mar. 2, 2023

(65) Prior Publication Data
US 2024/0340247 A1    Oct. 10, 2024

(30) Foreign Application Priority Data

Aug. 23, 2021 (CN) .......................... 202110968463.7

(51) Int. Cl.
*H04L 47/2441* (2022.01)
*H04L 67/02* (2022.01)
(52) U.S. Cl.
CPC .......... *H04L 47/2441* (2013.01); *H04L 67/02* (2013.01)

(58) Field of Classification Search
CPC ..... H04L 67/56; H04L 67/5682; H04L 67/02; H04W 72/543; H04W 28/02; H04W 28/0268; H04W 72/542
See application file for complete search history.

(56) References Cited

U.S. PATENT DOCUMENTS 10,911,977 B2 * 2/2021 Agiwal ................ H04W 28/06
2012/0033563 A1   2/2012 Jazra
(Continued)

FOREIGN PATENT DOCUMENTS

| CN | 101404597 A | 4/2009 |
| CN | 102594621 A | 7/2012 |

(Continued)

OTHER PUBLICATIONS

Internet Engineering Task Force SIP WGInternet Draft Handley/Schulzrinne/Schooler/Rosenberg draft-ietf-sip-rfc2543bis-04.txtACIRI/Columbia U./Caltech/dynamicsoftJul. 20, 2001 Expires: Feb. 2002, SIP: Session Initiation Protocol (Year: 2001).*

(Continued)

Primary Examiner — Chirag R Patel
(74) Attorney, Agent, or Firm — Li & Cai Intellectual Property (USA) Office

(57) ABSTRACT

The present disclosure provides a method for extracting a service feature, including: extracting a service feature field of an Internet Protocol (IP) data stream; and determining a service feature of the IP data stream according to the service feature field, with the service feature representing a Quality of Service (Qos) requirement of the IP data stream. The present disclosure further provides a Quality of Service scheduling method, an electronic device, and a computer-readable storage medium.

19 Claims, 9 Drawing Sheets

(56) References Cited

U.S. PATENT DOCUMENTS

| | | | |
|---|---|---|---|
| 2014/0016464 A1* | 1/2014 | Shirazipour | H04L 47/26 |
| | | | 370/235 |
| 2014/0334326 A1 | 11/2014 | Zhang et al. | |
| 2018/0123950 A1* | 5/2018 | Garg | H04L 45/22 |
| 2019/0090257 A1 | 3/2019 | Han et al. | |
| 2019/0215277 A1* | 7/2019 | Dhanoa | H04L 47/58 |
| 2023/0007527 A1* | 1/2023 | Baek | H04W 80/06 |
| 2023/0336486 A1* | 10/2023 | Song | H04L 47/22 |
| 2024/0155435 A1* | 5/2024 | Karapantelakis | H04W 28/24 |

FOREIGN PATENT DOCUMENTS

| | | | |
|---|---|---|---|
| CN | 102752792 A | | 10/2012 |
| CN | 105337753 A | | 2/2016 |
| JP | H11346238 A | | 12/1999 |
| JP | 2012034262 A | | 2/2012 |
| JP | 2016152453 A | | 8/2016 |

OTHER PUBLICATIONS

WIPO, International Search Report issued on Nov. 17, 2022.
Japan Patent Office, the first Office action dated Feb. 18, 2025, for corresponding JP application No. 2024-512112.
European Patent Office, the Extended European Search Report dated May 9, 2025, for corresponding EP application No. 22860398.1.

* cited by examiner

S220 generate at least one service feature table according to a data block size and an arrival delay of the at least one data block, with each data block corresponding to one service feature entry of the service feature table — S221 determine the number of service feature entries in the service feature table, and when the number of the service feature entries in the service feature table reaches a preset number threshold, determine that a preset statistical condition is met — S223 when the preset statistical condition is met, calculate an average value of data block sizes in the service feature table to obtain the data-block-size statistical value, and calculate an average value of arrival delays in the service feature table to obtain the arrival-delay statistical value — S222

FIG. 7

S220 generate at least one service feature table according to a data block size and an arrival delay of the at least one data block, with each data block corresponding to one service feature entry of the service feature table — S221 start a timer, and when the timer reaches a preset time threshold, determine that a preset statistical condition is met — S224 when the preset statistical condition is met, calculate an average value of data block sizes in the service feature table to obtain the data-block-size statistical value, and calculate an average value of arrival delays in the service feature table to obtain the arrival-delay statistical value — S222

S2561
cluster the data block information of the plurality of data blocks in the data block information table according to the data block size information to obtain a first clustering result

S2562
determine the service feature according to the first clustering result

S2563
cluster the data block information of the plurality of data blocks in the data block information table according to data block interval information to obtain a second clustering result

S2564
determine the service feature according to the second clustering result

S233
determine the service type of the IP data stream according to a service type field in the service feature field

FIG. 17 perform QoS scheduling according to a service feature of a data stream, with the service feature extracted with the method for extracting a service feature according to the embodiment of the present disclosure in the first aspect ⟵ S300
FIG. 18
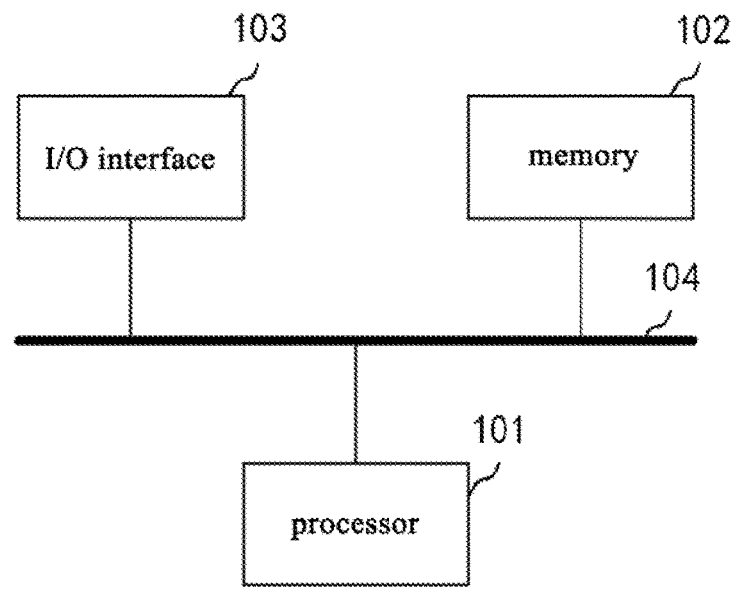
FIG. 19
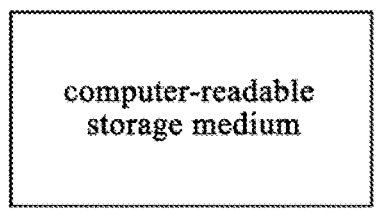
FIG. 20

METHOD FOR EXTRACTING A SERVICE FEATURE, QUALITY OF SERVICE SCHEDULING METHOD, ELECTRONIC DEVICE AND COMPUTER-READABLE STORAGE MEDIUM

CROSS REFERENCE TO RELATED APPLICATIONS

The present disclosure is a National Phase Application filed under 35 U.S.C. 371 as a national stage of PCT/CN2022/113546, filed on Aug. 19, 2022, an application claiming the priority to Chinese Patent Application No. 202110968463.7 filed on Aug. 23, 2021, the contents of which are incorporated herein by reference in their entirety.

TECHNICAL FIELD

The present disclosure relates to the technical field of communications, and in particular, to a method for extracting a service feature, a Quality of Service scheduling method, an electronic device, and a computer-readable storage medium.

BACKGROUND

For guaranteeing qualities of network services and improving user experience, it is of great significance to recognize service features of access networks and perform Quality of Service (QOS) scheduling according to the service features.

However, due to the limitation of network architecture, there is a lack of service feature recognition and accurate service quality assurance mechanisms in some access networks, which makes those access networks hard to meet the requirements of network intellectualization evolution.

SUMMARY

In a first aspect, an embodiment of the present disclosure provides a method for extracting a service feature, including: extracting a service feature field of an Internet Protocol (IP) data stream; and determining a service feature of the IP data stream according to the service feature field, with the service feature representing a Quality of Service (QOS) requirement of the IP data stream.

In a second aspect, an embodiment of the present disclosure provides a QoS scheduling method, including: performing QoS scheduling according to a service feature of a data stream, with the service feature extracted with the method for extracting a service feature according to the embodiment of the present disclosure in the first aspect.

In a third aspect, an embodiment of the present disclosure provides an electronic device, including: at least one processor; a memory having stored thereon at least one computer program which, when executed by the at least one processor, causes the at least one processor to implement at least one of the method for extracting a service feature according to the embodiment of the present disclosure in the first aspect or the QoS scheduling method according to the embodiment of the present disclosure in the second aspect; and at least one Input/Output (I/O) interface connected between the at least one processor and the memory and configured to enable information interaction between the at least one processor and the memory.

In a fourth aspect, an embodiment of the present disclosure provides a computer-readable storage medium having stored thereon a computer program which, when executed by a processor, causes the processor to implement at least one of the method for extracting a service feature according to the embodiment of the present disclosure in the first aspect or the QoS scheduling method according to the embodiment of the present disclosure in the second aspect.

BRIEF DESCRIPTION OF DRAWINGS

FIG. 7 is a flowchart of some operations in a method for extracting a service feature according to an embodiment of the present disclosure;

FIG. 8 is a flowchart of some operations in a method for extracting a service feature according to an embodiment of the present disclosure;

FIG. 15 is a flowchart of some operations in a method for extracting a service feature according to an embodiment of the present disclosure;

FIG. 16 is a flowchart of some operations in a method for extracting a service feature according to an embodiment of the present disclosure;

FIG. 17 is a flowchart of some operations in a method for extracting a service feature according to an embodiment of the present disclosure;

FIG. 18 is a flowchart illustrating a QoS scheduling method according to an embodiment of the present disclosure;

FIG. 19 is a block diagram of an electronic device according to an embodiment of the present disclosure; and FIG. 20 is a block diagram of a computer-readable storage medium according to an embodiment of the present disclosure.

DETAIL DESCRIPTION OF EMBODIMENTS

In order to enable those of ordinary skill in the art to better understand the technical solution of the present disclosure, a method for extracting a service feature, a QoS scheduling method, an electronic device, and a computer-readable storage medium provided by the present disclosure are described in detail below with reference to the drawings.

Exemplary embodiments will be described more fully below with reference to the drawings, but the exemplary embodiment described herein may be embodied in different forms, and the present disclosure should not be interpreted as being limited to the embodiment described herein. The embodiments are provided to make the present disclosure more thorough and complete, and are intended to enable those of ordinary skill in the art to fully understand the scope of the present disclosure.

The embodiments described herein and the features therein may be combined with one another if no conflict is incurred.

The term "and/or" used herein includes any or all combinations of one or more associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the terms "comprise/include" and/or "be made/formed of" used herein indicate the presence of the particular features, integers, operations, elements and/or components, but do not exclude the presence or addition of one or more other features, integers, operations, elements, components and/or combinations thereof.

Unless otherwise defined, all terms (including technical terms and scientific terms) used herein have the same meaning as commonly understood by those of ordinary skill in the art. It should be further understood that terms, such as those defined in commonly used dictionaries, should be interpreted as having a meaning that is consistent with a meaning in the context of the existing technology and the background of the present disclosure, and should not be interpreted in an idealized or overly formal sense unless expressly so defined herein.

Figure 1:
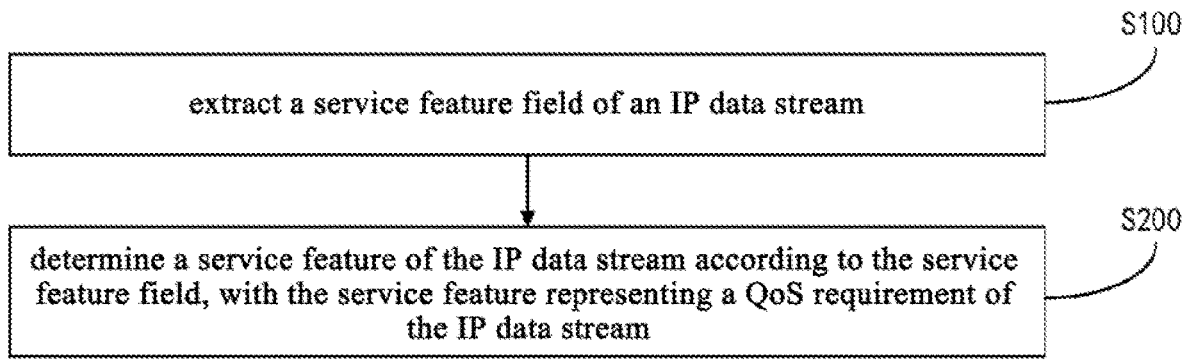
FIG. 1 is a flowchart illustrating a method for extracting a service feature according to an embodiment of the present disclosure.

In a first aspect, referring to FIG. 1, an embodiment of the present disclosure provides a method for extracting a service feature including the following operations S100 and S200.

At operation S100, extract a service feature field of an IP data stream.

At operation S200, determine a service feature of the IP data stream according to the service feature field, with the service feature representing a QoS requirement of the IP data stream.

In the method for extracting a service feature provided in the embodiment of the present disclosure, the IP data stream may be an IP data stream of a periodic data service or an IP data stream of a non-periodic data service, which is not specifically limited herein. A data service may be any one of a video service, a large bandwidth service, a large-bandwidth low-latency service, and a low-latency high-reliability service, which is not specifically limited herein.

In the method for extracting a service feature provided in the embodiment of the present disclosure, the service feature of the IP data stream determined at the operation S200 can represent a service characteristic of the data service corresponding to the IP data stream, and can also represent a QoS requirement of the data service, so that QoS scheduling can be performed based on the service feature of the IP data stream determined at the operation S200, so as to ensure quality of the data service.

In the method for extracting a service feature provided in the embodiment of the present disclosure, the service feature field is determined according to the service feature. The service feature field may be a field carried by the IP data stream itself or may be obtained by calculating according to a field carried by the IP data stream, which is not specifically limited herein.

In the method for extracting a service feature provided in the embodiment of the present disclosure, a service feature field corresponding to a periodic data service may be the same as or different from a service feature field corresponding to a non-periodic data service, which is not specifically limited herein. In some implementations, identification of the periodic data service and the non-periodic data service may be performed, and then a corresponding service feature field is extracted at the operation S100 according to an identification result.

In the method for extracting a service feature provided in the embodiment of the present disclosure, the service feature field is extracted by analyzing the IP data stream, the service feature is then determined according to the service feature field, and the service feature can represent the characteristic of the data service corresponding to the IP data stream and the QoS requirement of the data service, which can provide basis and support for QoS scheduling of a network, thereby effectively improving QoS experience of users, and realizing wireless network intellectualization centering on user equipment and service.

In some implementations, for the non-periodic data service, a feature of a data block is extracted as the service feature of the IP data stream of the non-periodic data service. The data block is composed of consecutive non-zero messages or data packets.

Figure 2:
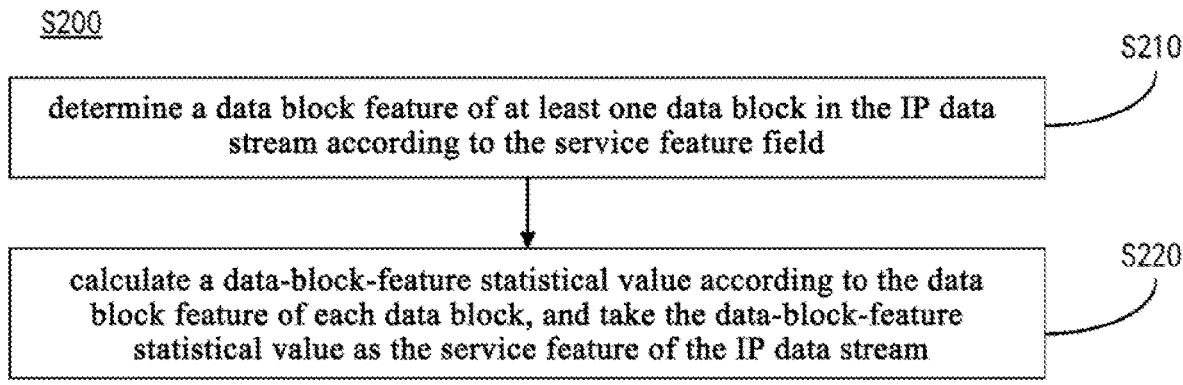
FIG. 2 is a flowchart of some operations in a method for extracting a service feature according to an embodiment of the present disclosure.

Correspondingly, in some implementations, referring to FIG. 2, the operation S200 includes the following operations S210 and S220.

At operation S210, determine a data block feature of at least one data block in the IP data stream according to the service feature field.

At operation S220, calculate a data-block-feature statistical value according to the data block feature of each data block, and take the data-block-feature statistical value as the service feature of the IP data stream.

The data block feature of the data block is not specifically limited in the embodiment of the present disclosure. For example, for the non-periodic service such as the video service, the large bandwidth service, the large-bandwidth low-latency service, or the low-latency high-reliability service, an arrival delay and/or a data block size of the data block are taken as the data block feature. In the method for extracting a service feature provided in the embodiment of the present disclosure, each data block is corresponding to a request (GET) message, and the arrival delay of the data block refers to a delay of an arrival moment of a first data packet (a start data packet) of the data block relative to an arrival moment of the GET message; and the data block size refers to the sum of sizes of all data packets of the data block.

In the method for extracting a service feature provided in the embodiment of the present disclosure, in some implementations, a content length field (Content-Length) is carried in the IP data stream, a value of the content length field indicates a data block size, and the data block size may be determined by extracting the content length field carried in the IP data stream; and in some implementations, no content length field is carried in the IP data stream, and the data block size may be determined by extracting size information of each data packet of the data block.

Figure 3:
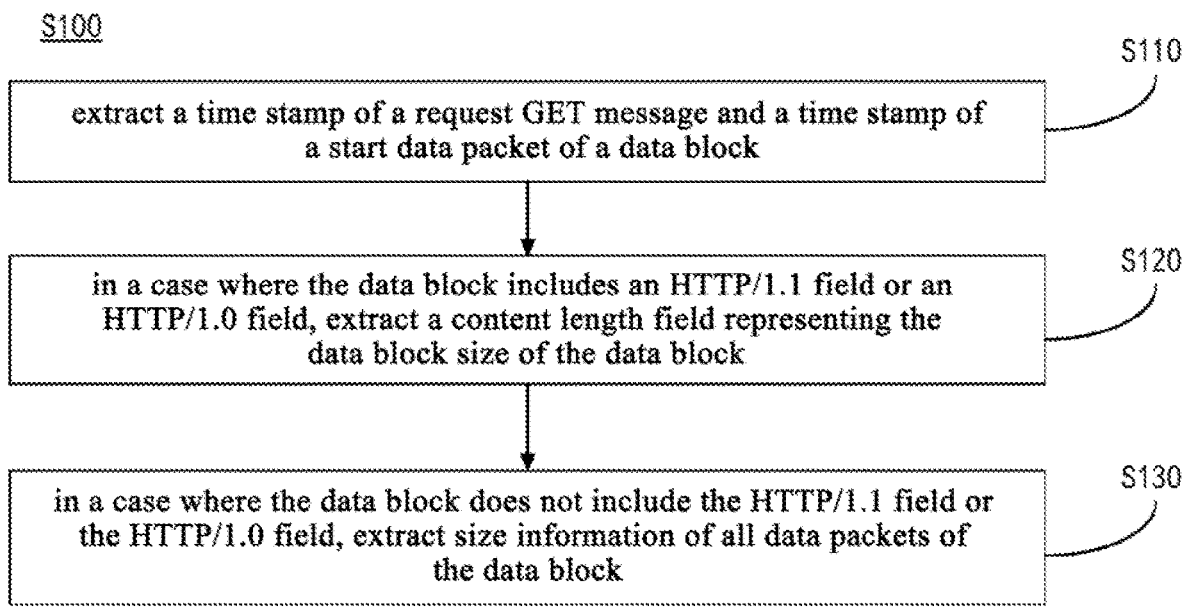
FIG. 3 is a flowchart of some operations in a method for extracting a service feature according to an embodiment of the present disclosure.

Correspondingly, in some implementations, referring to FIG. 3, the data block feature includes a data block size and an arrival delay of a data block, and the operation S100 includes the following operations S110 to S130.

At operation S110, extract a time stamp of a GET message and a time stamp of a start data packet of the data block.

At operation S120, in a case where the data block includes an HTTP/1.1 field or an HTTP/1.0 field, extract a content length field representing the data block size of the data block.

At operation S130, in a case where the data block does not include the HTTP/1.1 field or the HTTP/1.0 field, extract size information of all data packets of the data block.

It should be noted that, at the operation S110, when the time stamp of the GET message and the time stamp of the start data packet of the data block are determined, the arrival delay of the data block can be obtained through subtraction of the two time stamps.

It should be noted that there is a corresponding relationship between the content length field and the HTTP/1.1 field or the HTTP/1.0 field in the IP data stream, that is, if the HTTP/1.1 field or the HTTP/1.0 field is carried in the IP data stream, the content length field is also carried in the IP data stream. A format of the HTTP/1.1 field or the HTTP/1.0 field is fixed and is located at the beginning of Transmission Control Protocol (TCP) Payload, so it is easier to identify the HTTP/1.1 field or the HTTP/1.0 field than the content length field. At the operation S120, the data block size may be determined just by extracting the content length field; and at the operation S130, the data block size may be obtained by extracting and adding up the size information of all the data packets of the data block.

In some implementations, the GET message and the start data packet of the data block need to be identified first. In some implementations, the GET message is identified through a GET field. A data block corresponding to the GET message is after the GET message, and the start data packet of the data block is identified after the GET message is identified.

The present disclosure does not specifically limit how to identify the start data packet of the data block after the GET message is identified. In some implementations, the start data packet of the data block is determined according to a corresponding relationship between a value of an SEQ field and a value of an LEN field in the GET message and a value of an ACK field in the data packet.

Figure 4:
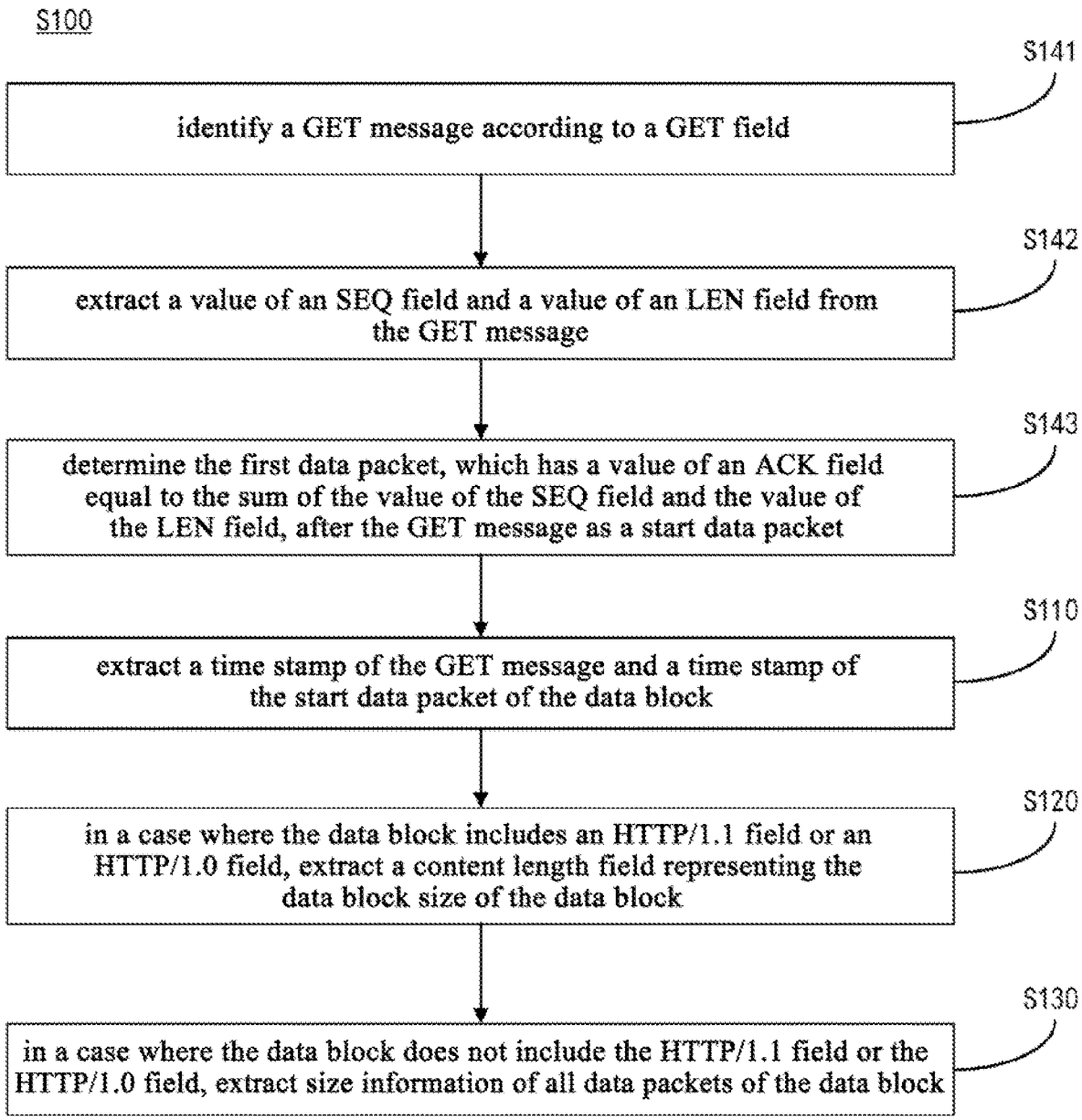
FIG. 4 is a flowchart of some operations in a method for extracting a service feature according to an embodiment of the present disclosure.

In some implementations, referring to FIG. 4, before extracting the time stamp of the GET message and the time stamp of the start data packet of the data block (i.e., the operation S110), the operation S100 further includes the following operations S141 to S143.

At operation S141, identify the GET message according to a GET field.

At operation S142, extract a value of an SEQ field and a value of an LEN field from the GET message.

At operation S143, determine the first data packet, which has a value of an ACK field equal to the sum of the value of the SEQ field and the value of the LEN field, after the GET message as the start data packet.

It should be noted that all data packets, each of which has a value of an ACK field equal to the sum of the value of the SEQ field and the value of the LEN field, after the GET message are the data packets of the data block corresponding to the GET message. Therefore, after obtaining the sum of the value of the SEQ field and the value of the LEN field, all the data packets of the data block may be identified through the ACK field, so that the data block size may be obtained by adding up the sizes of all the data packets.

In some implementations, the start data packet and an end data packet (the last data packet) of the data block are determined according to a data packet length.

Figure 5:
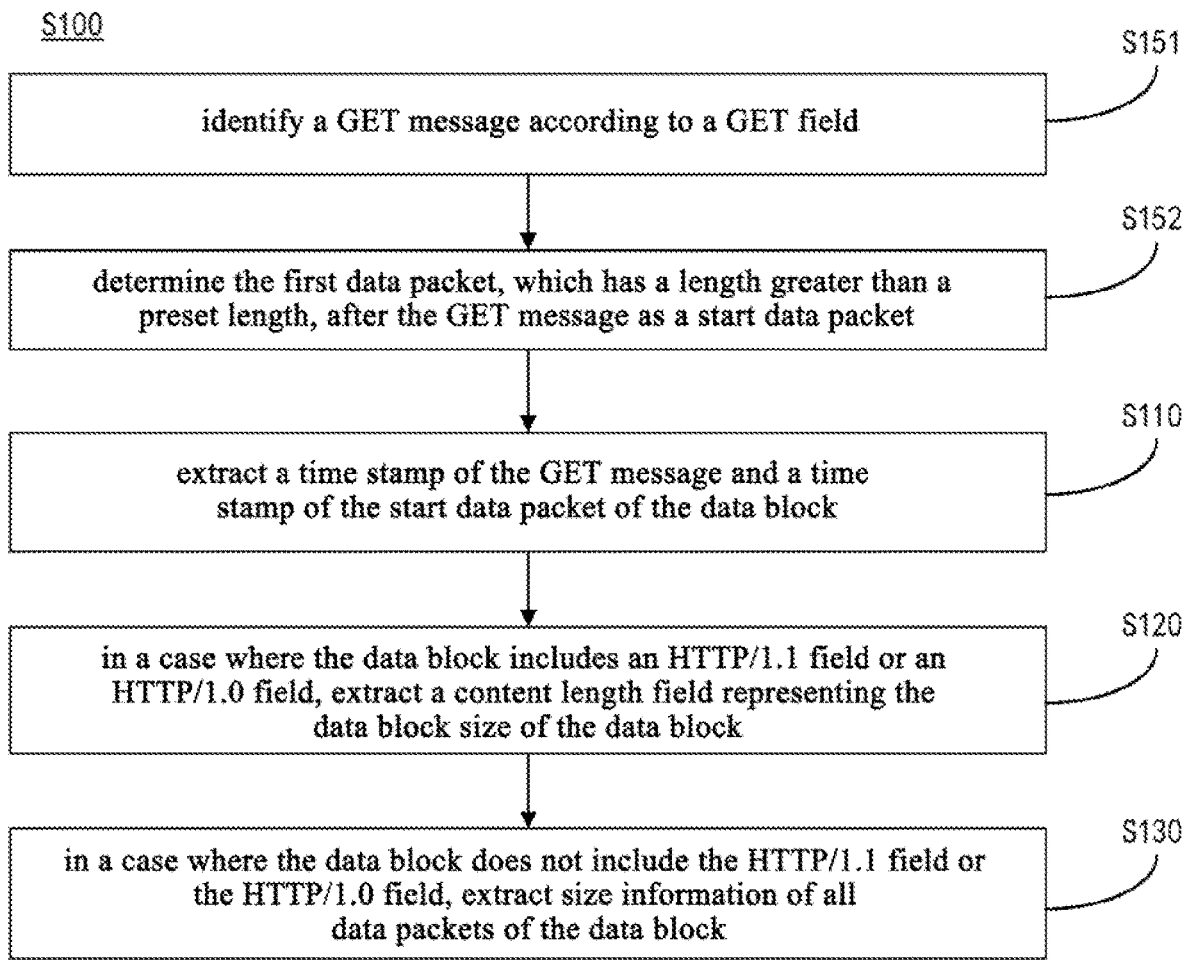
FIG. 5 is a flowchart of some operations in a method for extracting a service feature according to an embodiment of the present disclosure.

Correspondingly, in some implementations, referring to FIG. 5, before extracting the time stamp of the GET message and the time stamp of the start data packet of the data block (i.e., the operation S110), the operation S100 further includes the following operations S151 and S152.

At operation S151, identify the GET message according to a GET field.

At operation S152, determine the first data packet, which has a length greater than a preset length, after the GET message as the start data packet.

In some implementations, the end data packet of the data block may be further identified, for example, a data packet having a length less than a second preset length and greater than a third preset length is determined as the end data packet. The data block size may be obtained by adding up the sizes of all the data packets between the start data packet and the end data packet.

Figure 6:
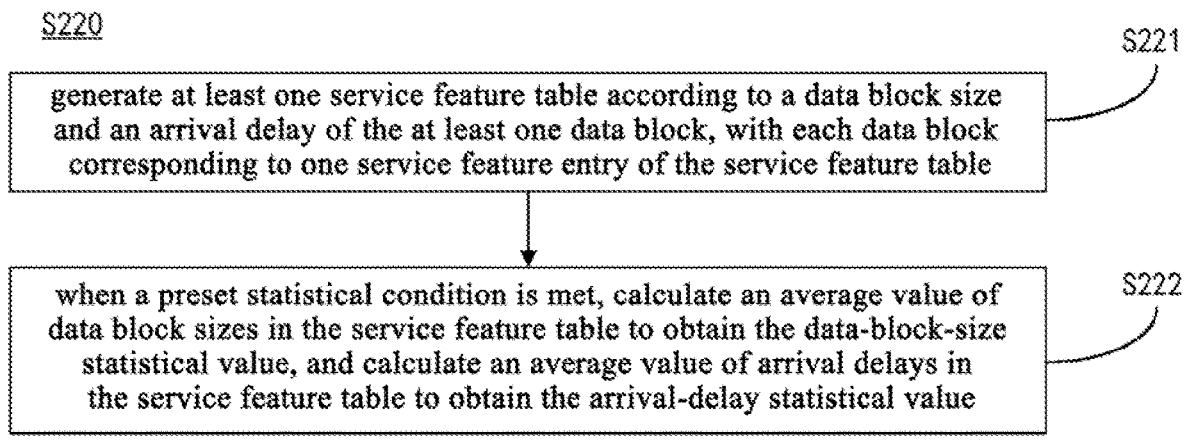
FIG. 6 is a flowchart of some operations in a method for extracting a service feature according to an embodiment of the present disclosure.

In some implementations, referring to FIG. 6, the data-block-feature statistical value includes a data-block-size statistical value and an arrival-delay statistical value, and the operation S220 includes the following operations S221 and S222.

At operation S221, generate at least one service feature table according to a data block size and an arrival delay of the at least one data block, with each data block corresponding to one service feature entry of the service feature table.

At operation S222, if a preset statistical condition is met, calculate an average value of data block sizes in the service feature table to obtain the data-block-size statistical value, and calculate an average value of arrival delays in the service feature table to obtain the arrival-delay statistical value.

In some implementations, referring to FIG. 7, the operation S220 further includes the following operation S223.

At operation S223, determine the number of service feature entries in the service feature table, and if the number of the service feature entries in the service feature table reaches a preset number threshold, determine that the preset statistical condition is met.

In some implementations, the preset number threshold is equal to a capacity of the service feature table. The preset number threshold is not specifically limited in the present disclosure, for example, the preset number threshold may be 10000.

In some implementations, referring to FIG. 8, the operation S220 further includes the following operation S224.

At operation S224, start a timer, and if the timer reaches a preset time threshold, determine that the preset statistical condition is met.

The method for extracting a service feature provided in the embodiment of the present disclosure can be also used for extracting the service feature of the IP data stream of the periodic service.

Figure 9:
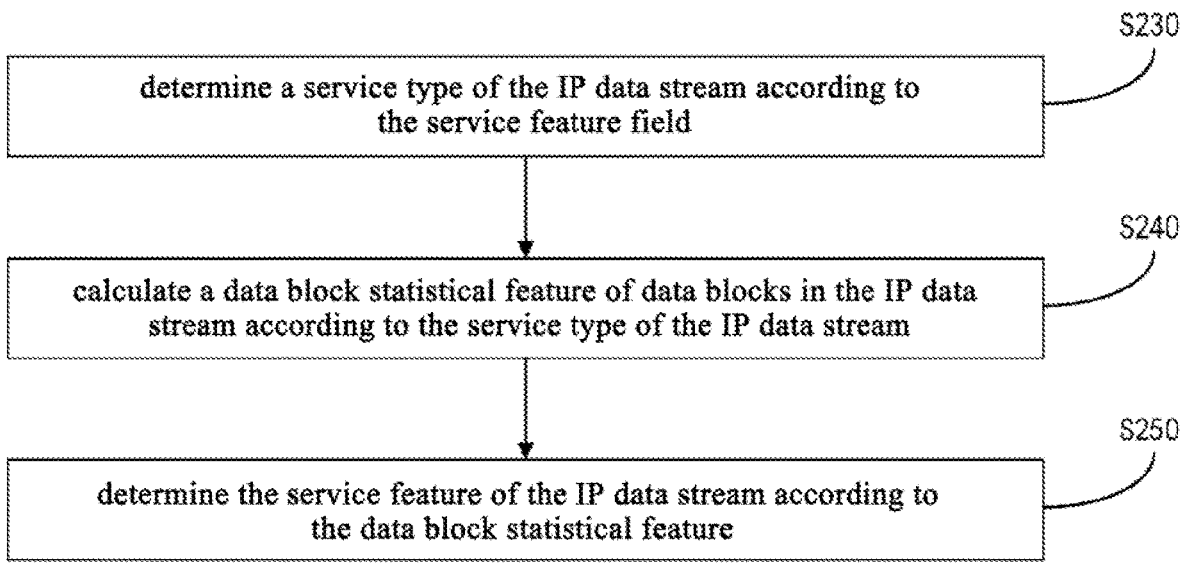
FIG. 9 is a flowchart of some operations in a method for extracting a service feature according to an embodiment of the present disclosure.

Correspondingly, in some implementations, referring to FIG. 9, the operation S200 includes the following operations S230 to S250.

At operation S230, determine a service type of the IP data stream according to the service feature field.

At operation S240, calculate a data block statistical feature of data blocks in the IP data stream according to the service type of the IP data stream.

At operation S250, determine the service feature of the IP data stream according to the data block statistical feature.

Figure 10:
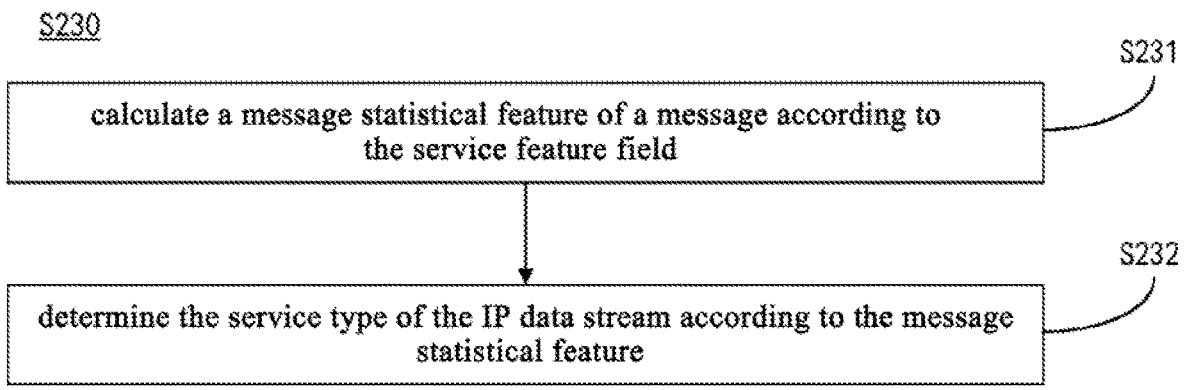
FIG. 10 is a flowchart of some operations in a method for extracting a service feature according to an embodiment of the present disclosure.

In some implementations, referring to FIG. 10, the operation S230 includes the following operations S231 and S232.

At operation S231, calculate a message statistical feature of a message according to the service feature field.

At operation S232, determine the service type of the IP data stream according to the message statistical feature.

Figure 11:
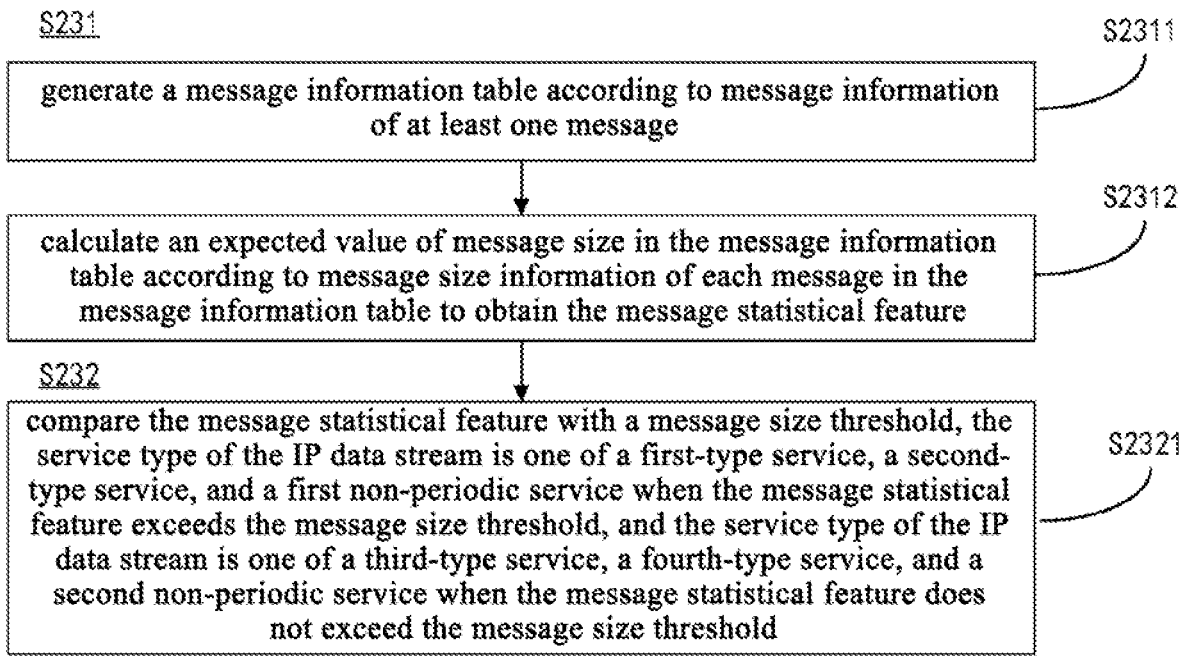
FIG. 11 is a flowchart of some operations in a method for extracting a service feature according to an embodiment of the present disclosure.

In some implementations, referring to FIG. 11, the service feature field includes message information of a message in the IP data stream, the operation S231 includes the following operations S2311 and S2312, and the operation S232 includes the following operation S2321.

At operation S2311, generate a message information table according to message information of at least one message.

At operation S2312, calculate an expected value of message size in the message information table according to message size information of each message in the message information table to obtain the message statistical feature.

At operation S2321, compare the message statistical feature with a message size threshold, the service type of the IP data stream is one of a first-type service, a second-type service, and a first non-periodic service if the message statistical feature exceeds the message size threshold, and the service type of the IP data stream is one of a third-type service, a fourth-type service, and a second non-periodic service if the message statistical feature does not exceed the message size threshold.

It should be noted that, in the method for extracting a service feature provided in the embodiment of the present disclosure, the first-type service is a large bandwidth service and has a plurality of data block size features; the second-type service is a large-bandwidth low-latency service and has a plurality of data block interval features; the third-type service is an uplink low-latency high-reliability service and has a periodic small message feature; the fourth-type service is a downlink low-latency high-reliability service and has a periodic small message feature; and the first non-periodic service and the second non-periodic service do not have obvious features.

Figure 12:
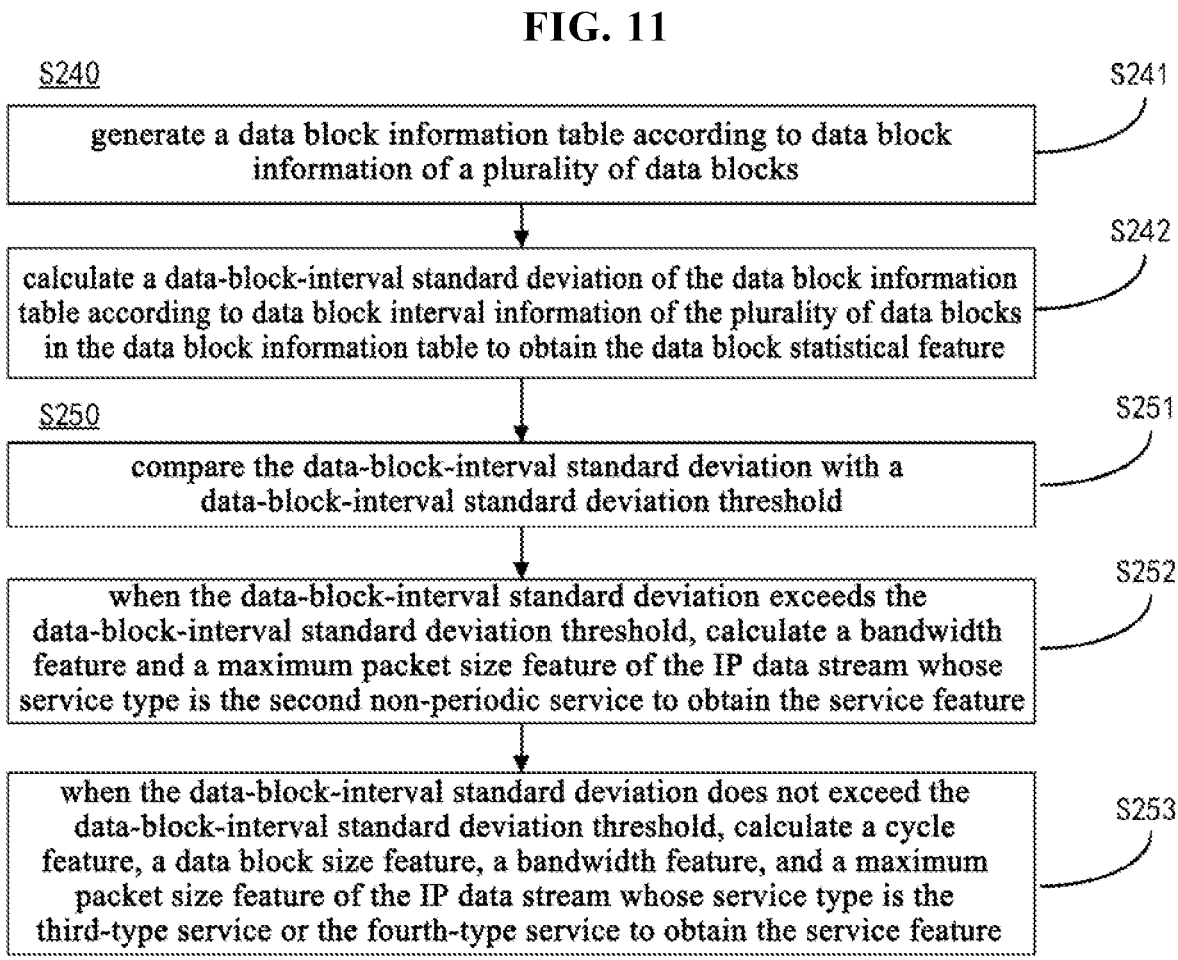
FIG. 12 is a flowchart of some operations in a method for extracting a service feature according to an embodiment of the present disclosure.

In some implementations, referring to FIG. 12, the service feature field further includes data block information of a data block in the IP data stream, and if the service type of the IP data stream is one of the third-type service, the fourth-type service, and the second non-periodic service, the operation S240 includes the following operations S241 and S242, and the operation S250 includes the following operations S251 to S253.

At operation S241, generate a data block information table according to data block information of a plurality of data blocks.

At operation S242, calculate a data-block-interval standard deviation of the data block information table according to data block interval information of the plurality of data blocks in the data block information table to obtain the data block statistical feature.

At operation S251, compare the data-block-interval standard deviation with a data-block-interval standard deviation threshold.

At operation S252, if the data-block-interval standard deviation exceeds the data-block-interval standard deviation threshold, which indicates that the service type of the IP data stream is the second non-periodic service, calculate a bandwidth feature and a maximum packet size feature of the IP data stream whose service type is the second non-periodic service to obtain the service feature.

At operation S253, if the data-block-interval standard deviation does not exceed the data-block-interval standard deviation threshold, which indicates that the service type of the IP data stream is the third-type service or the fourth-type service, calculate a cycle feature, a data block size feature, a bandwidth feature, and a maximum packet size feature of the IP data stream whose service type is the third-type service or the fourth-type service to obtain the service feature.

Figure 13:
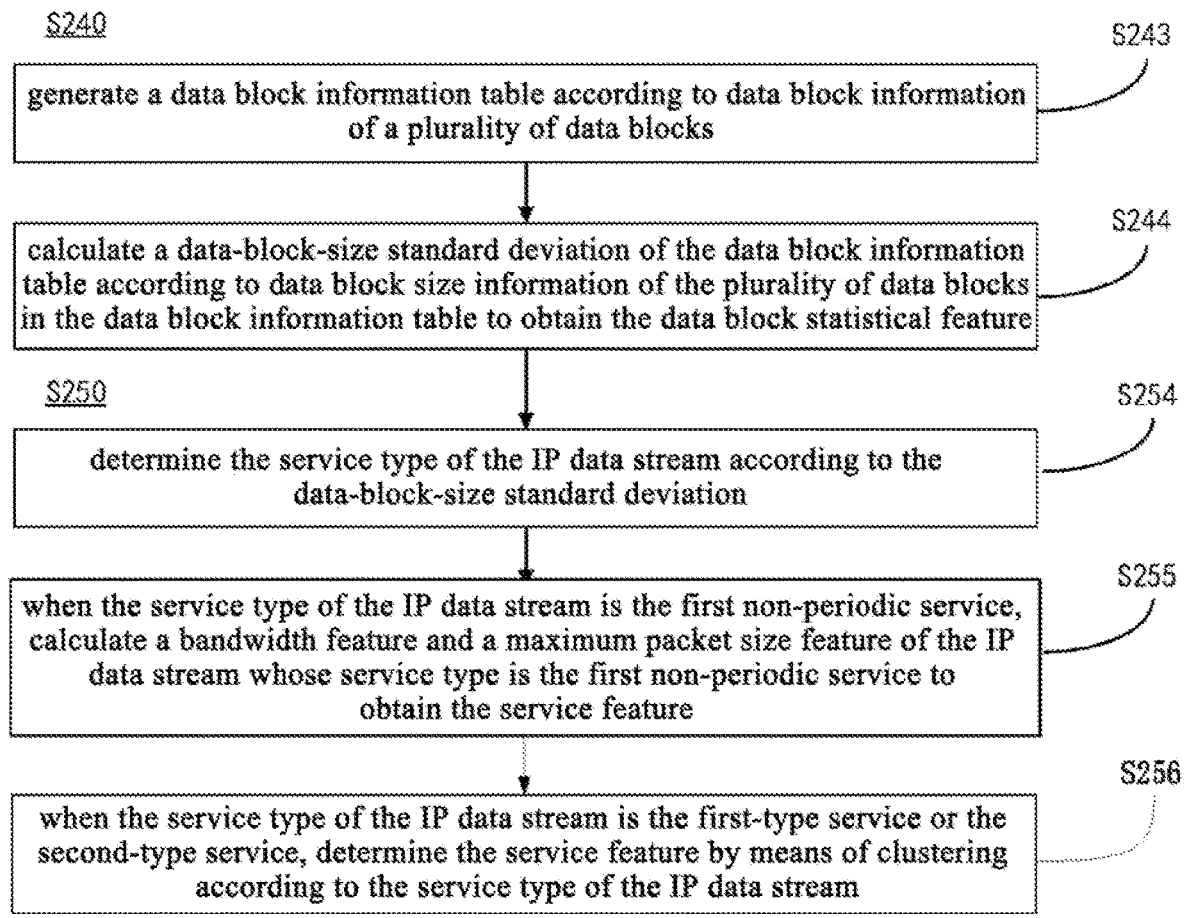
FIG. 13 is a flowchart of some operations in a method for extracting a service feature according to an embodiment of the present disclosure.

In some implementations, referring to FIG. 13, the service feature field further includes data block information of a data block in the IP data stream, and if the service type of the IP data stream is one of the first-type service, the second-type service, and the first non-periodic service, the operation S240 includes the following operations S243 and S244, and the operation S250 includes the following operations S254 to S256.

At operation S243, generate a data block information table according to data block information of a plurality of data blocks.

At operation S244, calculate a data-block-size standard deviation of the data block information table according to data block size information of the plurality of data blocks in the data block information table to obtain the data block statistical feature.

At operation S254, determine the service type of the IP data stream according to the data-block-size standard deviation.

At operation S255, if the service type of the IP data stream is the first non-periodic service, calculate a bandwidth feature and a maximum packet size feature of the IP data stream whose service type is the first non-periodic service to obtain the service feature.

At operation S256, if the service type of the IP data stream is the first-type service or the second-type service, determine the service feature by means of clustering according to the service type of the IP data stream.

Figure 14:
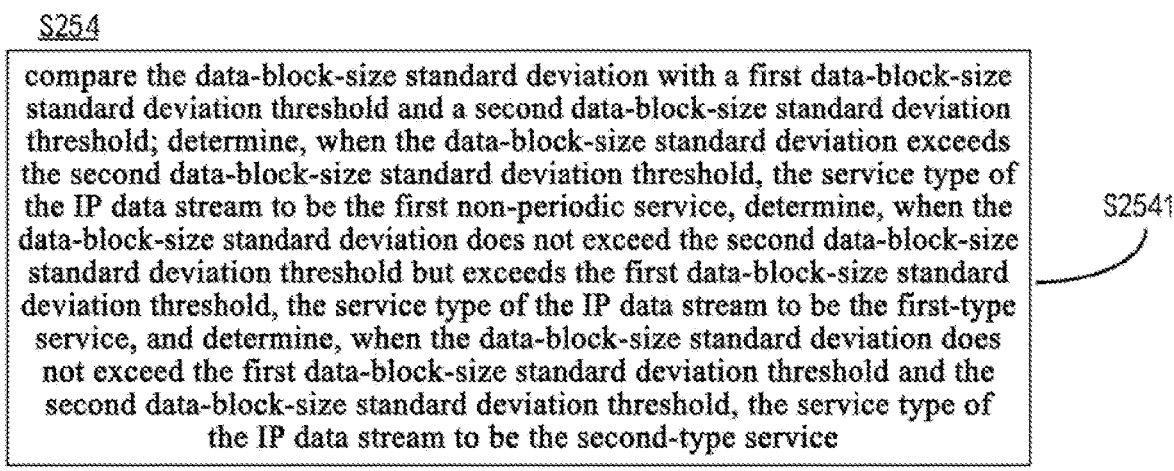
FIG. 14 is a flowchart of some operations in a method for extracting a service feature according to an embodiment of the present disclosure.

In some implementations, referring to FIG. 14, the operation S254 includes the following operation S2541.

At operation S2541, compare the data-block-size standard deviation with a first data-block-size standard deviation threshold and a second data-block-size standard deviation threshold, determine, if the data-block-size standard deviation exceeds the second data-block-size standard deviation threshold, the service type of the IP data stream to be the first non-periodic service, determine, if the data-block-size standard deviation does not exceed the second data-block-size standard deviation threshold but exceeds the first data-block-size standard deviation threshold, the service type of the IP data stream to be the first-type service, and determine, if the data-block-size standard deviation does not exceed the first data-block-size standard deviation threshold and the second data-block-size standard deviation threshold, the service type of the IP data stream to be the second-type service.

In some implementations, referring to FIG. 15, if the service type of the IP data stream is the first-type service, the operation S256 includes the following operations S2561 and S2562.

At operation S2561, cluster the data block information of the plurality of data blocks in the data block information table according to the data block size information to obtain a first clustering result.

At operation S2562, determine the service feature according to the first clustering result.

In some implementations, referring to FIG. 16, if the service type of the IP data stream is the second-type service, the operation S256 includes the following operations S2563 and S2564.

At operation S2563, cluster the data block information of the plurality of data blocks in the data block information table according to data block interval information to obtain a second clustering result.

At operation S2564, determine the service feature according to the second clustering result.

In some implementations, referring to FIG. 17, the operation S230 includes the following operation S233.

At operation S233, determine the service type of the IP data stream according to a service type field in the service feature field.

In a second aspect, referring to FIG. 18, an embodiment of the present disclosure provides a QoS scheduling method, including the following operation S300.

At operation S300, perform QoS scheduling according to a service feature of a data stream, with the service feature extracted with the method for extracting a service feature according to the embodiments of the present disclosure in the first aspect.

In the QoS scheduling method provided in the embodiment of the present disclosure, QoS scheduling of a network can be performed according to the service feature extracted with the method for extracting a service feature according to the embodiments of the present disclosure in the first aspect, so that QoS experience of users can be effectively improved, and wireless network intellectualization centering on user equipment and service can be realized.

In a third aspect, referring to FIG. 19, an embodiment of the present disclosure provides an electronic device, including: at least one processor 101 (merely one processor is shown in FIG. 19); a memory 102 having stored thereon at least one computer program which, when executed by the at least one processor 101, causes the at least one processor 101 to implement at least one of the method for extracting a service feature according to the embodiments of the present disclosure in the first aspect or the QOS scheduling method according to the embodiment of the present disclosure in the second aspect; and an I/O interface 103 connected between the processor 101 and the memory 102 and configured to enable information interaction between the processor 101 and the memory 102.

The processor 101 is a device having data processing capability, and includes, but is not limited to, a Central Processing Unit (CPU); the memory 102 is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and the I/O interface (read/write interface) 103 is connected between the processor 101 and the memory 102, may enable the information interaction between the processor 101 and the memory 102, and includes, but is not limited to, a data bus (Bus).

In some implementations, the processor 101, the memory 102, and the I/O interface 103 are connected to each other through a bus 104, and then are connected to other components of a computing device.

In a fourth aspect, referring to FIG. 20, an embodiment of the present disclosure provides a computer-readable storage medium having stored thereon a computer program which, when executed by a processor, causes the processor to implement at least one of the method for extracting a service feature according to the embodiments of the present disclosure in the first aspect or the QoS scheduling method according to the embodiment of the present disclosure in the second aspect.

In order to enable those of ordinary skill in the art to understand the technical solutions provided in the embodiments of the present disclosure more clearly, the technical solutions provided in the embodiments of the present disclosure are illustrated in detail below by specific examples.

Example One

A method for extracting a service feature for a non-periodic data service is proposed in this example, and includes: identifying and extracting feature fields from a data stream, calculating a service feature of the data stream according to identification and extraction results, and outputting a statistical result.

Identifying and extracting the feature fields from the data stream includes: identifying and extracting, from the data stream, an IP five-tuple (namely an source IP address, a source port, a destination IP address, a destination port, and a transport layer protocol), a GET field, an HTTP/1.1 field or an HTTP/1.0 field, a content length field (Content-Length), a data block start message, a data block end message, and an arrival moment of a message corresponding to each feature field.

Calculating the service feature of the data stream according to the identification and extraction results includes: identifying a GET message according to the GET field, and then calculating an arrival delay of a data block according to the arrival moment of the GET message and the arrival moment of the data block start message; directly extracting a data block size according to the HTTP/1.1 field or the HTTP/1.0 field and the content length field (Content-Length) in the message; performing accumulative addition according to the data block start message and the data block end message to obtain the data block size; and calculating duration of the data block according to a difference between the arrival moment of the data block start message and the arrival moment of the data block end message.

Outputting the statistical result includes: classifying and gathering all received data packets according to the IP five-tuple in a statistical manner to generate a service feature table. The service feature table includes a plurality of records of a current service stream, and each record includes an arrival delay and a data block size of a data block.

In some implementations, when the service feature table is full, an average value of the arrival delays of the data blocks and an average value of the data block sizes in the service feature table are calculated to obtain the statistical result, i.e., the service feature of a current IP data stream.

In some implementations, when a timer expires, the average value of the arrival delays of the data blocks and the average value of the data block sizes already recorded in the service feature table are calculated to obtain the statistical result, i.e., the service feature of the current IP data stream.

Example Two

A method for extracting a service feature for a periodic data service is proposed in this example, and includes: extracting an IP data message, calculating a message statistical feature and comparing the message statistical feature with a corresponding message statistical feature threshold, calculating a data block statistical feature according to a service type, comparing the data block statistical feature with a corresponding data block statistical feature threshold, distinguishing between the service types, and calculating a data block statistical feature to output a service feature of a data stream, or selecting a proper clustering method to perform clustering, performing a statistical process according to a clustering result, and outputting a statistical result.

Extracting the IP data message includes: writing information about the IP data message into a message information table. The message information table includes the information such as a message serial number, a message arrival moment, a message size, and a message direction.

Calculating the message statistical feature and comparing the message statistical feature with the corresponding message statistical feature threshold includes: extracting and calculating a statistical value of messages in the message information table, comparing the statistical value with a message size threshold, and preliminarily distinguishing between the service types. If the statistical value exceeds the message size threshold, the service type is the first-type service, the second-type service or the first non-periodic service; and if the statistical value does not exceed the message size threshold, the service type is the third-type service, the fourth-type service or the second non-periodic service.

The first-type service is a large bandwidth service and has a plurality of data block size features.

The second-type service is a large-bandwidth low-latency service and has a plurality of data block interval features.

The third-type service is an uplink low-latency high-reliability service and has a periodic small message feature.

The fourth-type service is a downlink low-latency high-reliability service and has a periodic small message feature.

The first non-periodic service and the second non-periodic service do not have obvious features.

Calculating the data block statistical feature according to the service type includes: if the service type is the first-type service, the second-type service or the first non-periodic service, generating a corresponding data block information table, extracting data block size information and calculating a data-block-size statistical value including, but not limited to, an expected value of data block size and a data-block-size standard deviation; and if the service type is the third-type service, the fourth-type service or the second non-periodic service, generating a corresponding data block information table, extracting data block interval information and calculating a data-block-interval statistical value including, but not limited to, an expected value of data block interval and a data-block-interval standard deviation.

Comparing the data block statistical feature with the corresponding data block statistical feature threshold, distinguishing between the service types, and calculating the data block statistical feature to output the service feature of the data stream includes: comparing the data-block-interval standard deviation with a data-block-interval standard deviation threshold, if the data-block-interval standard deviation does not exceed the data-block-interval standard deviation threshold, determining the service type to be the third-type service or the fourth-type service, respectively calculating an expected value of data block size, a bandwidth, and a maximum packet size of the third-type service or the fourth-type service, and extracting the expected value of data block interval as the service feature of the data stream to output; and if the data-block-interval standard deviation exceeds the data-block-interval standard deviation threshold, determining the service type to be the second non-periodic service, recording a data block size and a data block interval as 0, and calculating a bandwidth and a maximum packet size as the service feature of the data stream to output.

Comparing the data block statistical feature with the corresponding data block statistical feature threshold, distinguishing between the service types, and calculating the data block statistical feature to output the service feature of the data stream, or selecting the proper clustering method to perform clustering includes: comparing the data-block-size standard deviation with a second data-block-size standard deviation threshold, if he data-block-size standard deviation does not exceed the second data-block-size standard deviation threshold, determining the service type to be the first-type service or the second-type service, then comparing the data-block-size standard deviation with a first data-block-size standard deviation threshold, if the data-block-size standard deviation does not exceed the first data-block-size standard deviation threshold, determining the service type to be the second-type service, generating a data block information table of the second-type service, and performing clustering according to a data block interval; if the data-block-size standard deviation exceeds the first data-block-size standard deviation threshold, determining the service type to be the first-type service, generating a data block information table of the first-type service, and performing clustering according to a data block size; and if the data-block-size standard deviation exceeds the second data-block-size standard deviation threshold, determining the service type to be the first non-periodic service, recording the data block size and the data block interval as 0, and calculating a bandwidth and a maximum packet size as the service feature of the data stream to output.

Performing the statistical process according to the clustering result, and outputting the statistical result includes: if the service type is the first-type service, calculating an expected value of data block size and an expected value of data block interval of each clustered data according to the data block size clustering result, and calculating a bandwidth and a maximum packet size as the service feature of the data stream to output; if the service type is the second-type service, calculating an expected value of data block size and an expected value of data block interval of each clustered data according to the data block interval clustering result, and calculating a bandwidth and a maximum packet size as the service feature of the data stream to output; and if the service type is the non-periodic service, recording the data block size and the data block interval as 0, and calculating a bandwidth and a maximum packet size as the service feature of the data stream to output.

Example Three

An apparatus for identifying a non-periodic service feature is provided in this example, and includes: an online analysis module, an offline module, and a prediction module.

In this example, the input is an original IP data stream. The input IP data stream is duplicated to obtain two IP data streams, one is input to the online analysis module, and the other is input to the offline module; and the output is a service feature of the IP data stream, which includes a data block size and a data arrival delay.

The online analysis module is configured to analyze a data packet in real time, identify a message GET field, identify a message HTTP/1.1 field, extract data packet size information, and simultaneously read a predicted arrival moment from the offline module.

The offline module is configured to identify the message GET field, identify the message HTTP/1.1 field, identify a first packet of data block and a last packet of data block, and extract or calculate data block size information; to calculate a time interval between a GET message and the first packet of data block; and to establish and maintain a service feature library.

The prediction module is configured to output a data block size (obtained by analyzing a special field or by calculation); and to output a delay between the GET message and the first packet of data block (obtained by calculation).

The service feature library is composed of a plurality of service feature tables, and a typical structure of a service feature table is shown in Table 1.

TABLE 1

| No. (serial number) | App ID + App port + protocol (server IP address + server port number + protocol number) | data size (data block size) (unit: byte) | HTTP/1.1 field (if data size is directly read from HTTP/1.1 field: Y; if data size is not directly read from HTTP/1.1 field: N) | Delay (unit: ms) | UL/DL (uplink/ downlink) | app_tag (application identification) |
|---|---|---|---|---|---|---|
| 1 | | | | | | |
| 2 | | | | | | |
| ... | | | | | | |
| Table-Length (capacity of service feature table) | | | | | | |

The service feature table includes the following contents.

The combination of server IP address+server port number+protocol number (App IP+App port+protocol): a server IP address, a server port number, and a protocol number derived by analyzing an IP five-tuple of a message. The combinations of server IP address+server port number+protocol number (App IP+App port+protocol) are the same in a same service feature table, a capacity of each table is denoted as a capacity of service feature table (tableLength) having a default value of 10000, which indicates that 10000 analysis records of a same service stream can be recorded in the service feature table. If the number of the service feature tables is denoted as a table number (tableNum), a capacity of the whole feature library is: tableNum× tableLength.

data size (data block size): a data block size corresponding to a current GET message.

Delay: a delay between a current GET message and a corresponding first packet of data block.

app_tag (application identification): for identifying a video application (APP) to which a service stream belongs.

Updating of a service feature table: a first-in first-out manner is adopted, newly received data is written to the end of the service feature table, and 10000 records at most are dynamically maintained.

Message GET field: GET keywords are located in the first three bytes of an HTTP message. The ASCII code of the message GET field is 47 45 54 (hexadecimal). The HTTP message is packaged into a TCP message after being added with a TCP header, and the TCP message is packaged into an IP message after being added with an IP header. A header length of an IPV6 message is 40 bytes, a header length of an IPV4 message is 20 bytes, and a header length of the TCP message is 20 bytes.

During the identification of the GET field, in the case of an IPV6 message, the identification of the GET field may be performed by detecting whether the $61^{st}$ byte to the $63^{rd}$ byte of the IPV6 message are 47 45 54 (hexadecimal); and in the case of an IPV4 message, the identification of the GET field may be performed by detecting whether the $41^{st}$ byte to the $43^{rd}$ byte of the IPv4 message are 47 45 54 (hexadecimal).

Message HTTP/1.1 field: data packets from the message immediately following the GET message are traversed and analyzed. If a payload part (payload) of a data packet includes an HTTP/1.1 field, which indicates that the data packet carries data block size information, a value of a content length field (Content-Length) in the payload part (payload) is extracted, and the value of content length field is a data block size corresponding to the current GET message.

The ASCII code of the HTTP/1.1 field is 48 54 54 50 2f 31 2e 31 (hexadecimal), and the HTTP/1.1 field is located in the first eight bytes of TCP payload. Similar to the identification of the GET field, in the case of an IPV6 message, the identification of the HTTP/1.1 field may be performed by detecting whether the $61^{st}$ byte to the 68th byte of the IPv6 message are 48 54 54 50 2f 31 2e 31; and in the case of an IPV4 message, the identification of the HTTP/1.1 field may be performed by detecting whether the $61^{st}$ byte to the 68th byte of the IPv4 message are 48 54 54 50 2f 31 2e 31.

The following two methods may be adopted to identify the first packet of data block.

Method One

The data packets from the message immediately following the GET message are traversed and analyzed. If a length of a data packet is larger than 1400 bytes, the current message is taken as the first packet of data block.

Method Two

Operation 1: extracting a value of an Seq field and a value of an Len field from the GET message, and adding up the values of the two fields to obtain the sum thereof, with the Seq field representing a segment serial number of TCP message, the Len field being a total length field of IP message and including a header length and a data length.

Operation 2: traversing and analyzing the data packets from the message immediately following the GET message, and when it is detected that a value of an Ack field value in a message is equal to the sum of the value of the Seq field and the value of the Len field of the GET message obtained in the operation 1, taking the current message as the first packet of data block.

There are two methods for identifying the end packet of data block as follows.

Method One

The data packets from the message immediately following the GET message are traversed and analyzed. If a length of a data packet is larger than 150 bytes and smaller than 1000 bytes, the data packet is taken as the end packet of data block.

Method Two

Operation 1: extracting a value of an Seq field and a value of an Len field from the GET message, and adding up the values of the two fields to obtain the sum thereof, with the Seq field representing a segment serial number of TCP message, the Len field being a total length field of IP message and including a header length and a data length.

Operation 2: traversing and analyzing the data packets from the message immediately following the GET message, marking all the data packets each meeting the condition that a value of an Ack field value in a message is equal to the sum of the value of the Seq field and the value of the Len field of the GET message obtained in the operation 1, and taking the last data packet of the marked data packets as the end packet of data block.

Data block size: corresponding to the field of data size in Table 1. There are two methods for calculating the data block size as follows.

Method One (a Payload Part (Payload) of a Message Includes an HTTP/1.1 Field)

A value of a content length field (Content-Length) in a payload part (payload) of a data packet is directly read, and the value is a data block size corresponding to the current GET message.

Method Two (a Payload Part (Payload) of a Message does not Include an HTTP/1.1 Field)

All the data packets between a current head packet of data block and a current end packet of data block are added up to obtain the sum which is a data block size corresponding to the GET message.

Data arrival delay: corresponding to the field of Delay in Table 1, a time stamp of each GET message of a current IP data stream and a time stamp of a first packet of data block corresponding to the GET message are obtained, and subtraction of the two time stamps are performed to obtain a data block delay.

Expected value of data block size and expected value of delay: a timer (tabelUPdateTimer) (default: 60 s) is started when Table 1 is established, and the following operations are performed when the time expires: clearing the timer (tabelUPdateTimer) to 0, and then restarting the timer; calculating an average value of all current values under data size in Table 1, and updating a current data-block-size statistical value (avg_size); and calculating an average value of all current values under Delay in Table 1, and updating a current data delay statistical value (avg_delay).

Example Four

A method for extracting a service feature for a periodic service is provided in this example, and includes: extracting an IP data message, calculating a message statistical feature and comparing the message statistical feature with a corresponding message statistical feature threshold, calculating a data block statistical feature according to a service type, comparing the data block statistical feature with a corresponding data block statistical feature threshold, further distinguishing between the service types, and calculating a data block statistical feature to output a service feature of a data stream, or selecting a proper clustering method to perform clustering and performing a statistical process according to a clustering result, and outputting a statistical result.

Extracting the IP data message includes: writing information about the IP data message into a message information table. The message information table is used for recording of captured original message information including a message arrival number (pktNo), a message arrival moment (pktTstp), a message size (pktSize), and a message direction (pktDir). The message direction (pktDir) refers to a transmission direction of the message, with the uplink direction denoted as UL and the downlink direction denoted as DL.

The message information table is composed of ten data sections, and a section capacity of each section is 1000 by default. A message of one data section is captured from an IP data stream each time; and after a total of ten data sections are captured, the statistical table is filled up. After the statistical table is filled up, if a new data section is captured, the data section (section 1) with the minimum number in the statistical table is discarded, and the new data section is added to the end of the statistical table. A typical structure of the message information table is shown in Table 2.

TABLE 2

|  | Section 1 | Section 2 | Section 3 | . | Section 10 | Section 11 |
|---|---|---|---|---|---|---|
| pktNo (message arrival number) | 1 | 2 | ... | Section capacity | | |
| pktTstp (message arrival moment) (unit: μs) | | | ... | | | |
| pktSize (message size) (IP header total length field, unit: byte) | | | ... | | | |

TABLE 2-continued

|  | Section 1 | | | | Section 2 | Section 3 | . | Section 10 | Section 11 |
|---|---|---|---|---|---|---|---|---|---|
| pktDir (message direction) | UL | DL | DL | UL | | | | | |

Calculating the message statistical feature and comparing the message statistical feature with the corresponding message statistical feature threshold includes: when the message information table is filled up, performing a calculation based on the message information in the message information table. In some implementations, when a timer expires and the message information table is not full, the calculation is performed based on the message information already recorded in the message information table. The calculation is performed in a following way: extracting a nonzero value of the message size field (pktSize) in the message information table, calculating an expected value (pktSizeNAvg) of the extracted nonzero message, comparing the expected value with a message size threshold (pktSizeThr) (default: 200 bytes), preliminarily distinguishing between the service types, and if the expected value (pktSizeNAvg) of the nonzero message exceeds the message size threshold (pktSizeThr), determining the service type to be the first-type service, the second-type service or the first non-periodic service; and if the expected value (pktSizeNAvg) of the nonzero message does not exceed the message size threshold, determining the service type to be the third-type service, the fourth-type service or the second non-periodic service.

The first-type service is a large bandwidth service and has a plurality of data block size features. For example, the first-type service is a video monitoring service or an online live service The second-type service is a large-bandwidth low-latency service and has a plurality of data block interval features. For example, the second-type service is uploading a high-definition image taken by a camera in a production line for real-time quality inspection.

The third-type service is an uplink low-latency high-reliability service and has a periodic small message feature. For example, the third-type service is collecting and uploading data by a sensor in a production line or in an industrial park.

The fourth-type service is a downlink low-latency high-reliability service and has a periodic small message feature. For example, the fourth-type service is issuing an operation control instruction to control a mechanical arm to operate in a production line.

The first non-periodic service and the second non-periodic service are services without obvious periodicity, such as noise and interference, and do not have cycle features.

Calculating the data block statistical feature according to the service type includes: if the service type is the first-type service, the second-type service or the first non-periodic service, generating a data block information table, extracting data block size information and calculating a data-block-size statistical value including, but not limited to, an expected value of data block size (dbSizeAvg) and a data-block-size standard deviation (dbSizeStd); and if the service type is the third-type service, the fourth-type service or the second non-periodic service, generating a corresponding data block information table, extracting data block interval information and calculating a data-block-interval statistical value including, but not limited to, an expected value of data block interval (dbItvlAvg) and a data-block-interval standard deviation (dbItvlStd).

The data block information table is used for recording of data block information, and a data block is composed of successive nonzero messages. The data block information includes a data block number (dbNo), start time (dbStart), end time (dbEnd), a data block size (dbSize), a data block interval (dbItvl), and data block duration (dbDu). dbStart is a message moment of the first packet in the data block, and dbEnd is a message moment of the last packet in the data block. When building the data block information table, according to service type ID (serviceTypeID) tags, the following five data block information tables (service type 0 to service type 4) are generated:
serviceTypeID=0, non-periodic service;
serviceTypeID=1, first-type service;
serviceTypeID=2, second-type service;
serviceTypeID=3, third-type service; and
serviceTypeID=4, fourth-type service.

Table 3 is the data block information table of the first-type service (serviceTypeID=1).

TABLE 3

| | serviceTypeID = 1 | | | |
|---|---|---|---|---|
| dbNo | 1 | 2 | ... | M |
| dbStart (μs) | $t_{s1}$ | $t_{s2}$ | ... | $t_{sm}$ |
| dbEnd (μs) | $t_{e1}$ | $t_{e2}$ | ... | $t_{em}$ |
| dbSize (byte) | $a_1$ | $a_2$ | ... | $a_m$ |
| dbItvl (ms) | | $t_{s2} - t_{s1}$ | ... | $t_{sm} - t_{s(m-1)}$ |
| dbDu (ms) | $t_{e1} - t_{s1}$ | $t_{e2} - t_{s2}$ | ... | $t_{em} - t_{sm}$ |

The start time of the data block is arrival time of the first packet of the data block. The arrival time of the first packet of the data block may be determined in a following way: for the first-type service and the second-type service: if a length of a message is larger than bPktThr (default: 1468 bytes), determining the message as the first packet of the data block, and recording the first packet moment dbStart of the data block; and for the third-type service and the fourth-type service: if lengths of three successive messages are larger than sPktThr (default: 64 bytes), determining the first message in the three successive messages as the first packet of the data block, and recording the first packet moment dbStart of the data block.

The end time of the data block is arrival time of the last packet of the data block. The arrival time of the last packet of the data block may be determined in a following way: after the first packet of the data block is identified, traversing from the message immediately following the first packet of the data block; for the first-type service and the second-type service: if a length of a message is smaller than bPktThr (default: 1468 bytes), determining the message as the end packet of the data block, and recording the end packet moment dbEnd of the data block; and for the third-type service and the fourth-type service: if a length of a message is not larger than sPktThr (default: 64 bytes), determining the message as the end packet of the data block, and recording the end packet moment dbEnd of the data block.

The data block size (dbSize) is the sum of message sizes of a plurality of successive messages that meet a condition. The data block size in this example is the sum obtained by adding up lengths of all data packets between a current first packet of the data block and a current last packet of the data block.

The data block interval (dbItvl) is obtained by subtraction of two adjacent first packet moments of the data blocks.

The data block duration (dbDu) is obtained by subtraction of an arrival moment of the first packet of a data block from an arrival moment of the last packet of the same data block.

Comparing the data block statistical feature with the corresponding data block statistical feature threshold, and further distinguishing between the service types includes: comparing the data-block-interval standard deviation (dbItvlStd) with a data-block-interval standard deviation threshold (dbItvlStdThr), and if dbItvlStd does not exceed dbItvlStdThr, determining the service type to be the third-service type or the fourth-type service. The third-type service is an uplink service, the fourth-type service is a downlink service, and feature calculation methods of the two types of services are the same. The feature calculation method is as follows.

Cycle feature: the expected value of data block interval (dbItvlAvg) is extracted as a cycle feature of the data stream, and an output mode of the cycle feature is shown in Table 4.

TABLE 4

| IP five-tuple (source IP/port, destination IP/port, protocol type) | service type (0 to 4) | cycle feature (ms) |
| --- | --- | --- |

Data block size feature: the expected value of data block size (dbSizeAvg) is extracted as a data block size feature of the data stream, and an output mode of the data block size feature is shown in Table 5.

TABLE 5

| IP five-tuple (source IP/port, destination IP/port, protocol type) | service type (0 to 4) | data block size feature (ms) |
| --- | --- | --- |

Bandwidth feature: a data volume (a data packet sum) generated by a corresponding type of service is counted by taking 2000 ms as a unit to obtain a bandwidth value, and a statistical average value of the obtained multiple bandwidth values is calculated to obtain a bandwidth feature of the data stream, and an output mode of the bandwidth feature is shown in Table 6.

TABLE 6

| IP five-tuple (source IP/port, destination IP/port, protocol type) | service type (0 to 4) | bandwidth (kbps) |
| --- | --- | --- |

Maximum packet size feature: the maximum value of pktSize of messages of a corresponding service type in the statistical table of the data packets are traversed to obtain a maximum packet size feature of the data stream, and an output mode of the maximum packet size feature is shown in Table 7.

TABLE 7

| IP five-tuple (source IP/port, destination IP/port, protocol type) | service type (0 to 4) | maximum packet size (byte) |
| --- | --- | --- |

If dbItvlStd exceeds dbItvlStdThr, the service type is the second non-periodic service, and a feature calculation method of the second non-periodic service is as follows.

Cycle feature: 0. An output mode of the cycle feature is as shown in Table 4.

Data block size feature: 0. An output mode of the data block size feature is as shown in Table 5.

Bandwidth feature: a data volume generated by the non-periodic service is counted by taking 2000 ms as a unit to obtain a bandwidth value, and a statistical average value of the obtained multiple bandwidth values is calculated to obtain a bandwidth feature. An output mode of the bandwidth feature is as shown in Table 6.

Maximum packet size feature: the maximum value of pktSize corresponding to the non-periodic service in the statistical table of the data packets are traversed to obtain a maximum packet size feature of the data stream. An output mode of the maximum packet size feature is as shown in Table 7.

Comparing the data block statistical feature with the corresponding data block statistical feature threshold, further distinguishing between the service types, and calculating the data block statistical feature to output the service feature of the data stream further includes: comparing the data-block-size standard deviation (dbSizeStd) with a second data-block-size standard deviation threshold (dbSizeStdThr2) (default: 2*pktSizeNAvg), if dbSizeStd does not exceed dbSizeStdThr2, determining the service type to be the first-type service or the second-type service (which needs to be further determined), and if dbSizeStd exceeds dbSizeStdThr2, determining the service type to be the first non-periodic service having a feature calculation method as follows.

Cycle feature: 0. An output mode of the cycle feature is as shown in Table 4.

Data block size feature: 0. An output mode of the data block size feature is as shown in Table 5.

Bandwidth feature: a data volume generated by the non-periodic service is counted by taking 2000 ms as a unit to obtain a bandwidth value, and a statistical average value of the obtained multiple bandwidth values is calculated to obtain a bandwidth feature. An output mode of the bandwidth feature is as shown in Table 6.

Maximum packet size feature: the maximum value of pktSize corresponding to the non-periodic service in the statistical table of the data packets are traversed to obtain a maximum packet size feature of the data stream. An output mode of the maximum packet size feature is as shown in Table 7.

Selecting the proper clustering method to perform clustering and performing the statistical process according to the clustering result, and outputting the statistical result includes: comparing the data-block-size standard deviation (dbSizeStd) with a first data-block-size standard deviation threshold (dbSizeStdThr1) (default: 0.5*pktSizeNAvg), if dbSizeStd does not exceed dbSizeStdThr1, determining the service type to be the second-service type, generating the data block information table of the second-type service, and performing clustering according to the data block interval (dbItvl); and if dbSizeStd exceeds dbSizeStdThr1, determining the service type to be the first-type service, generating the data block information table of the first-type service, and performing clustering according to the data block size (dbSize).

The clustering is performed in an unsupervised clustering manner. In the case of the first-type service, the clustering is performed according to the data block size (dbSize). In this example, the number of cycles of the first-type service is 2, and K-means clustering algorithm is adopted, and a label corresponding to each data block size (dbSize) is counted to generate a new statistical table. A category to which a current data block size (dbSize) belongs and statistical data of a cluster center are recorded in each new statistical table, and the cluster center is the expected value of dbSize.

The K-means clustering algorithm uses the python sklearn.cluster.KMeans function, with the parameter nclusters set to 2 and the other parameters set to default values.

In the case of the second-type service, the clustering is performed according to dbItvl. Since the number of cycles is unknown, the clustering is performed by adopting mean_shift algorithm, and the number of clustered categories is the number of cycles. A label corresponding to each data block interval (dbItvl) is counted to generate a new statistical table. A category to which a current data block interval (dbItvl) belongs and statistical data of a cluster center are recorded in each new statistical table, and the cluster center is the expected value of dbItvl.

The mean_shift algorithm uses the python sklearn.cluster.MeanShift function, with the parameters set to default values.

In the case of the first-type service, the clustering is performed according to the data block size (dbSize). For each clustering data, the expected value (dbItvlAvg) of data block interval (dbItvl) is calculated as a cycle feature, and an output mode of the cycle feature is as shown in Table 4. For each clustering data, the cluster center is taken as a data block size feature, and an output mode of the data block size feature is as shown in Table 5. For each clustering data, a data volume generated within 2000 ms is counted as a bandwidth value, and a statistical average value of the obtained multiple bandwidth values is calculated to obtain a bandwidth feature, and an output mode of the bandwidth feature is as shown in Table 6. For each clustering data, the maximum value of pktSize of messages of a corresponding service type in the statistical table of the data packets are traversed to obtain a maximum packet size feature of the data stream, and an output mode of the maximum packet size feature is as shown in Table 7.

In the case of the second-type service, the clustering is performed according to the data block interval (dbItvl). For each clustering data, the cluster center is taken as a cycle feature, and an output mode of the cycle feature is as shown in Table 4. For each clustering data, the expected value (dbSizeAvg) of data block size (dbSize) is calculated as a data block size feature, and an output mode of the data block size feature is as shown in Table 5. For each clustering data, a data volume generated within 2000 ms is counted as a bandwidth value, and a statistical average value of the obtained multiple bandwidth values is calculated to obtain a bandwidth feature, and an output mode of the bandwidth feature is as shown in Table 6. For each clustering data, the maximum value of pktSize of messages of a corresponding service type in the statistical table of the data packets are traversed to obtain a maximum packet size feature of the data stream, and an output mode of the maximum packet size feature is as shown in Table 7.

If the case of the first non-periodic service, the data-block-interval statistical value is recorded as 0 and taken as a cycle feature, and an output mode of the cycle feature is as shown in Table 4. The data-block-size statistical value is recorded as 0 and taken as a data block size feature, and an output mode of the data block size feature is as shown in Table 5. A data volume generated within 2000 ms is counted as a bandwidth value, and a statistical average value of the obtained multiple bandwidth values is calculated to obtain a bandwidth feature, and an output mode of the bandwidth feature is as shown in Table 6. The maximum value of pktSize of messages of a corresponding service type in the statistical table of the data packets are traversed to obtain a maximum packet size feature of the data stream, and an output mode of the maximum packet size feature is as shown in Table 7.

It should be understood by those of ordinary skill in the art that the functional modules/units in all or some of the operations and the devices in the methods disclosed above may be implemented as software, firmware, hardware, or suitable combinations thereof. If implemented as hardware, the dividing between the functional modules/units stated above is not necessarily corresponding to the dividing of physical components; for example, one physical component may have a plurality of functions, or one function or operation may be performed through cooperation of several physical components. Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable medium used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication medium generally includes computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details may be made without departing from the scope of the present disclosure as claimed by the appended claims.

What is claimed is:

1. A method for extracting a service feature, comprising:
   extracting a service feature field of an Internet Protocol (IP) data stream; and
   determining a service feature of the IP data stream according to the service feature field, wherein the service feature represents a Quality of Service (QoS) requirement of the IP data stream,
   wherein determining the service feature of the IP data stream according to the service feature field comprises:
   determining a data block feature of at least one data block in the IP data stream according to the service feature field, wherein the data block feature comprises a data block size and an arrival delay of a data block; and
   calculating a data-block-feature statistical value according to the data block feature of each data block, and taking the data-block-feature statistical value as the service feature of the IP data stream, wherein the data-block-feature statistical value comprises a data-block-size statistical value and an arrival-delay statistical value.

2. The method of claim 1, wherein extracting the service feature field of the IP data stream comprises:
   extracting a time stamp of a request (GET) message and a time stamp of a start data packet of the data block;
   in a case where the data block comprises an HTTP/1.1 field or an HTTP/1.0 field, extracting a content length field representing the data block size of the data block; and
   in a case where the data block does not comprise the HTTP/1.1 field or the HTTP/1.0 field, extracting size information of all data packets of the data block.

3. The method of claim 2, wherein extracting the service feature field of the IP data stream further comprises:
   before extracting the time stamp of the GET message and the time stamp of the start data packet of the data block, identifying the GET message according to a GET field;
   extracting a value of an SEQ field and a value of an LEN field from the GET message; and
   determining a first data packet, which has a value of an ACK field equal to a sum of the value of the SEQ field and the value of the LEN field, after the GET message as the start data packet.

4. The method of claim 2, wherein extracting the service feature field of the IP data stream further comprises:
   before extracting the time stamp of the GET message and the time stamp of the start data packet of the data block, identifying the GET message according to a GET field; and
   determining a first data packet, which has a length greater than a preset length, after the GET message as the start data packet.

5. The method of claim 2, wherein calculating the data-block-feature statistical value according to the data block feature of each data block comprises:
   generating at least one service feature table according to a data block size and an arrival delay of the at least one data block, wherein each data block corresponds to one service feature entry of the service feature table; and
   in a case where a preset statistical condition is met, calculating an average value of data block sizes in the service feature table to obtain the data-block-size statistical value, and calculating an average value of arrival delays in the service feature table to obtain the arrival-delay statistical value.

6. The method of claim 5, wherein calculating the data-block-feature statistical value according to the data block feature of each data block further comprises:
   determining a number of service feature entries in the service feature table; and
   in a case where the number of the service feature entries in the service feature table reaches a preset number threshold, determining that the preset statistical condition is met.

7. The method of claim 5, wherein calculating the data-block-feature statistical value according to the data block feature of each data block further comprises:
   starting a timer; and
   in a case where the timer reaches a preset time threshold, determining that the preset statistical condition is met.

8. The method of claim 1, wherein determining the service feature of the IP data stream according to the service feature field comprises:
   determining a service type of the IP data stream according to the service feature field;
   calculating a data block statistical feature of data blocks in the IP data stream according to the service type of the IP data stream; and
   determining the service feature of the IP data stream according to the data block statistical feature.

9. The method of claim 8, wherein determining the service type of the IP data stream according to the service feature field comprises:
   calculating a message statistical feature of a message according to the service feature field; and
   determining the service type of the IP data stream according to the message statistical feature.

10. The method of claim 9, wherein the service feature field comprises message information of a message in the IP data stream, and calculating the message statistical feature of the message according to the service feature field comprises:
    generating a message information table according to message information of at least one message; and
    according to message size information of each message in the message information table, calculating an expected value of message size in the message information table to obtain the message statistical feature,
    determining the service type of the IP data stream according to the message statistical feature comprises:
    comparing the message statistical feature with a message size threshold;
    in a case where the message statistical feature exceeds the message size threshold, determining the service type of the IP data stream to be one of a first-type service, a second-type service, and a first non-periodic service; and
    in a case where the message statistical feature does not exceed the message size threshold, determining the service type of the IP data stream to be one of a third-type service, a fourth-type service, and a second non-periodic service.

11. The method of claim 10, wherein the service feature field further comprises data block information of a data block in the IP data stream, and in a case where the service type of the IP data stream is one of the third-type service, the fourth-type service, and the second non-periodic service, calculating the data block statistical feature of the data blocks in the IP data stream according to the service type of the IP data stream comprises:
    generating a data block information table according to data block information of a plurality of data blocks; and according to data block interval information of the plurality of data blocks in the data block information table, calculating a data-block-interval standard deviation of the data block information table to obtain the data block statistical feature, determining the service feature of the IP data stream according to the data block statistical feature comprises:

comparing the data-block-interval standard deviation with a data-block-interval standard deviation threshold;

in a case where the data-block-interval standard deviation exceeds the data-block-interval standard deviation threshold, which indicates that the service type of the IP data stream is the second non-periodic service, calculating a bandwidth feature and a maximum packet size feature of the IP data stream whose service type is the second non-periodic service to obtain the service feature; and in a case where the data-block-interval standard deviation does not exceed the data-block-interval standard deviation threshold, which indicates that the service type of the IP data stream is the third-type service or the fourth-type service, calculating a cycle feature, a data block size feature, a bandwidth feature, and a maximum packet size feature of the IP data stream whose service type is the third-type service or the fourth-type service to obtain the service feature.

12. The method of claim 10, wherein the service feature field further comprises data block information of a data block in the IP data stream, and in a case where the service type of the IP data stream is one of the first-type service, the second-type service, and the first non-periodic service, calculating the data block statistical feature of the data blocks in the IP data stream according to the service type of the IP data stream comprises:

generating a data block information table according to data block information of a plurality of data blocks; and according to data block size information of the plurality of data blocks in the data block information table, calculating a data-block-size standard deviation of the data block information table to obtain the data block statistical feature, determining the service feature of the IP data stream according to the data block statistical feature comprises:

determining the service type of the IP data stream according to the data-block-size standard deviation;

in a case where the service type of the IP data stream is the first non-periodic service, calculating a bandwidth feature and a maximum packet size feature of the IP data stream whose service type is the first non-periodic service to obtain the service feature; and in a case where the service type of the IP data stream is the first-type service or the second-type service, determining the service feature by means of clustering according to the service type of the IP data stream.

13. The method of claim 12, wherein determining the service type of the IP data stream according to the data-block-size standard deviation comprises:

comparing the data-block-size standard deviation with a first data-block-size standard deviation threshold and a second data-block-size standard deviation threshold;

in a case where the data-block-size standard deviation exceeds the second data-block-size standard deviation threshold, determining the service type of the IP data stream to be the first non-periodic service;

in a case where the data-block-size standard deviation does not exceed the second data-block-size standard deviation threshold but exceeds the first data-block-size standard deviation threshold, determining the service type of the IP data stream to be the first-type service; and in a case where the data-block-size standard deviation does not exceed the first data-block-size standard deviation threshold and the second data-block-size standard deviation threshold, determining the service type of the IP data stream to be the second-type service.

14. The method of claim 13, wherein in a case where the service type of the IP data stream is the first-type service, determining the service feature by means of clustering according to the service type of the IP data stream comprises:

clustering the data block information of the plurality of data blocks in the data block information table according to the data block size information to obtain a first clustering result; and determining the service feature according to the first clustering result, wherein in a case where the service type of the IP data stream is the second-type service, determining the service feature by means of clustering according to the service type of the IP data stream comprises:

clustering the data block information of the plurality of data blocks in the data block information table according to data block interval information to obtain a second clustering result; and determining the service feature according to the second clustering result.

15. The method of claim 8, wherein determining the service type of the IP data stream according to the service feature field comprises:

determining the service type of the IP data stream according to a service type field in the service feature field.

16. A Quality of Service (QoS) scheduling method, comprising:

performing QoS scheduling according to a service feature of a data stream, wherein the service feature is extracted with the method for extracting a service feature of claim 1.

17. An electronic device, comprising:

at least one processor;

a memory having stored thereon at least one computer program which, when executed by the at least one processor, causes the at least one processor to implement the method for extracting a service feature of claim 1; and at least one Input/Output (I/O) interface connected between the at least one processor and the memory and configured to enable information interaction between the at least one processor and the memory.

18. A non-transitory computer-readable storage medium having stored thereon a computer program which, when executed by a processor, implements the method for extracting a service feature of claim 1.

19. An electronic device, comprising:

at least one processor;

a memory having stored thereon at least one computer program which, when executed by the at least one processor, causes the at least one processor to implement the QoS scheduling method of claim 16; and at least one Input/Output (I/O) interface connected between the at least one processor and the memory and configured to enable information interaction between the at least one processor and the memory.

* * * * *